United States Patent [19]

Eder

[11] Patent Number: 4,596,006
[45] Date of Patent: Jun. 17, 1986

[54] ULTRASONIC OBJECT DETECTOR

[75] Inventor: Kenneth C. Eder, Blaine, Minn.

[73] Assignee: Honeywell Inc., Minneapolis, Minn.

[21] Appl. No.: 590,315

[22] Filed: Mar. 16, 1984

[51] Int. Cl.⁴ .................................... H04B 11/00
[52] U.S. Cl. ........................................ 367/87; 367/93
[58] Field of Search ............... 367/87, 99, 113, 114, 367/151, 93; 73/614–616; 310/335

[56] References Cited

U.S. PATENT DOCUMENTS

| 2,448,399 | 8/1948 | Shaw . | |
|---|---|---|---|
| 2,467,301 | 4/1949 | Firestone . | |
| 2,826,753 | 3/1958 | Chapin . | |
| 3,148,343 | 9/1964 | Lockhart . | |
| 3,351,896 | 11/1967 | Rowlands | 367/113 |
| 3,577,144 | 5/1971 | Girault . | |
| 3,599,747 | 8/1971 | Hansen et al. | 367/151 |
| 3,690,154 | 9/1972 | Wells et al. . | |
| 3,742,442 | 6/1973 | Leyde et al. | 310/335 |
| 3,902,357 | 9/1975 | Soldner et al. . | |
| 3,960,007 | 6/1976 | Swensen . | |
| 4,063,549 | 12/1977 | Beretsky et al. | 367/87 |
| 4,096,756 | 6/1978 | Alphone | 367/151 |
| 4,358,835 | 11/1982 | Fage | 367/87 |
| 4,442,512 | 4/1984 | Kodera et al. | 367/87 |

Primary Examiner—Thomas H. Tarcza
Assistant Examiner—Daniel T. Pihulic
Attorney, Agent, or Firm—Charles L. Rubow

[57] ABSTRACT

A single transducer ultrasonic target detector and detection method are disclosed which provide for detection down to substantially zero distance from the detector housing envelope with an electroacoustic transducer subject to unavoidable ringing following emission of a burst of acoustic energy. The housing is configured with a retroreflecting surface proximate the transducer so that acoustic energy reflected from the target is repeatedly reflected back toward the target until the ringing has subsided sufficiently to permit reception of the reflected acoustic energy by the transducer.

20 Claims, 4 Drawing Figures

ULTRASONIC OBJECT DETECTOR

BACKGROUND OF THE INVENTION

The invention disclosed herein relates generally to ultrasonic sensors, and more specifically to single transducer ultrasonic sensors of the type which alternately emit and receive pulses of ultrasonic energy for object detection.

There are at least two general techniques for ultrasonically detecting the presence of an object. One involves transmitting a continuous sinusoidal or sinusoidally modulated wave toward the object, and measuring the phase shift in the wave reflected back therefrom. Transmission of ultrasonic energy and reception of reflections thereof can be accomplished with separate transmitting and receiving transducers. The phase shift which has occurred during signal transit can be determined by phase comparison circuitry. Such a system is disclosed in U.S. Pat. No. 3,577,144 issued to P. Girault on May 4, 1971.

A two transducer continuous transmission system has certain disadvantages. Most obviously, two transducers are required, thus contributing to the cost and physical size of the system. Further, the transducer elements must be closely tuned to one another. The requirement for initially matching the transducer elements contributes to manufacturing cost and complexity. In addition, the transducer elements are subject to frequency drift, thus requiring means for adjusting tuning circuits associated with one or both transducer elements. The tuning circuits and devices further contribute to the cost and complexity of such systems. The tuning process may also contribute to operational time lags, inaccuracies and other limitations.

The foregoing problems and limitations can be avoided in a system using a single transducer for both the transmission and reception of ultrasonic energy. Examples of such systems are shown in U.S. Pat. No. 2,826,753 issued to R. Chapin on Mar. 11, 1958 (reissued Dec. 19, 1961 as U.S. Pat. No. Re. 25,100), and U.S. Pat. No. 3,960,007 issued to E. Swenson on June 1, 1976. In such systems, a standing wave is set up between the transducer and target object. An impedance mismatch, depending on the relative phases of the transmitted and reflected waves, occurs at the transducer and is reflected back into its drive circuitry. This results in variations in the drive voltage which can be used to indicate presence of the object.

Continuous wave systems as previously described are capable of very good detection at relatively short ranges. However, they require relatively high input power since the transmission is continuous, and operational range is relatively short. Attempts to increase range by increasing the input power result in increased heating and rapid deterioration of the transducer element(s).

A second general detection technique is based on reception of a portion of a transmitted pulse reflected from the target object. This can be accomplished either with separate transmitting and receiving transducers or with a single transducer which performs both functions. As in connection with continuous transmission sensors, the transducers in a two transducer pulse transmission sensor must be relatively well matched. The second transducer again contributes to the cost, complexity and size of the sensor package.

Again, at least some of the disadvantages of two transducer pulse transmission sensors are avoided in single transducer implementations. However, single transducer pulse transmission sensors are subject to certain significant limitations because of the effects of mechanical resonance or ringing of the transducer element after each emission of a burst of acoustic energy. The ringing subsides to an acceptable level after a time interval based on damping properties of the transducer. However, until such a level is reached, the transducer is not capable of reliably detecting incoming acoustic energy reflected from a target. This results in inability to detect objects at very short ranges from the transducer. Such a limitation is unacceptable in many ultrasonic sensor applications.

The problem has been dealt with in the fields of ultrasonic flaw detection and medical imaging by using an intermediate member or delay medium between the transducer and the object being tested. U.S. Pat. Nos. 2,467,301 issued to F. Firestone on April 12, 1949, 3,690,154 issued to F. Wells, et al on Sept. 12, 1972 and 3,902,357 issued to R. Soldner, et al on Sept. 2, 1975 disclose blocks of polystyrene or other materials and containers of water or other fluids used for this purpose. In general, the addition of extraneous elements is undesirable because such elements add to the cost and physical size of a system, and may detract from applicability and ease of use. With particular regard to noncontact object detection, the use of intermediate substances as delay media may not be feasible or possible.

Finally, U.S. patent application Ser. No. 550,326 filed Nov. 9, 1983 now U.S. Pat. No. 4,527,360 and assigned to the same assignee as the present application discloses a single transducer pulse transmission ultrasonic distance sensor which provides for range sensing down to zero distance from the sensor housing envelope by mounting the transducer in a housing configured such that an acoustic path at least half as great as the distance travelled by an acoustic signal during the transducer ringing interval is provided within the housing envelope. Provision for such a continuous acoustic path within the housing envelope results in an enlarged envelope which may be undesirable in some applications. In addition circuitry required for sensing distance with such a sensor is more complicated than required or desirable for simply detecting presence of an object.

The applicant has devised a single transducer pulse transmission ultrasonic sensor having a unique housing design and component arrangement without extraneous components which avoids limitations on short range operation so as to permit object detection down to substantially zero distance from the sensor housing envelope.

SUMMARY OF THE INVENTION

The present invention is a single transducer pulse transmission ultrasonic object detector and detection method capable of operation down to substantially zero distance between the detector housing envelope and target object. The detector apparatus basically comprises a housing which supports an electroacoustic transducer adapted to be driven by an electrical signal so that it alternately emits a burst of acoustic energy and converts the portion of the burst of acoustic energy reflected back from a remote target to a corresponding electrical signal. The housing includes retroreflector means proximate the transducer for reflecting at least a portion of the acoustic energy reflected from the target back toward the target, whereby such reflections are continued until unavoidable ringing of the transducer following emission of a burst of acoustic energy has subsided. The retroreflector means may comprise a reflecting surface configured as a spherical section having its center of curvature centered on the transducer beam pattern at a distance from the transducer equal to approximately two-thirds the distance which the acoustic energy travels during one-half the transducer ringing interval.

The detection method basically comprises transmitting a burst of acoustic energy toward a target, repeatedly reflecting at least a portion of the acoustic energy reflected from the target back toward the target and detecting acoustic energy reflected from the target after the transducer ringing interval has passed.

DESCRIPTION OF THE PREFERRED EMBODIMENT

Figure 1:
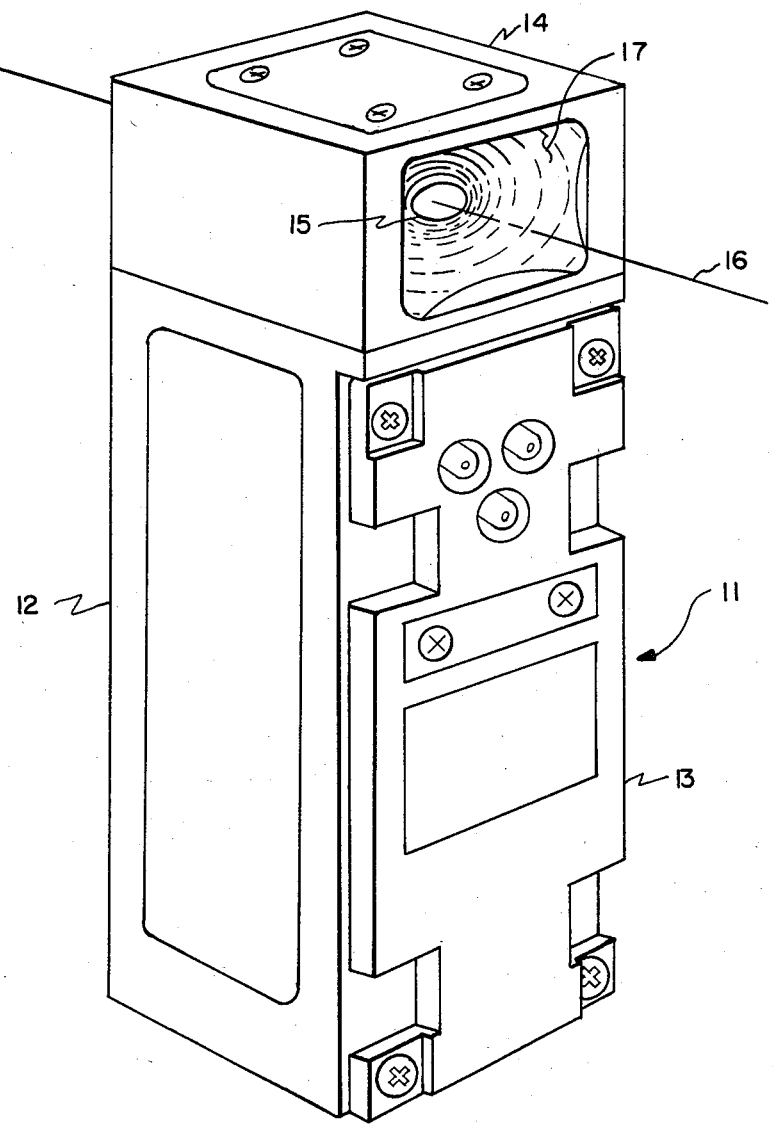
FIG. 1 is a perspective external view of the housing of an ultrasonic sensor in accordance with the present invention.

In FIG. 1, reference numeral 11 generally identifies a housing for an ultrasonic object detector in accordance with the applicant's invention. Housing 11 comprises a hollow body 12 with a cover 13 which together form a compartment for signal processing circuitry employed in the object detector. Housing 11 also includes a head 14 which supports an electroacoustic transducer element 15 having a beam pattern such that it transmits and/or receives acoustic energy generally along an axis 16. Head 14 is detachably mounted on body 12 by means of removable fastners (not shown) and may be repositioned relative to the body so as to provide flexibility in sensor installation arrangements.

Head 14 is provided with a reflective surface 17 surrounding transducer 15. Surface 17 is configured to serve as a retroreflector so as to return at least a portion of any acoustic energy impinging thereon back in the direction from which it was received. As shown schematically in FIG. 2, surface 17 may be configured as a section of a spherical surface having its center of curvature 18 on axis 16.

In operation, transducer 15 is periodically driven with an electrical signal which causes it to transmit a burst of acoustic energy. If an object is present within the beam pattern of transducer 15, a portion of the transmitted acoustic energy, depending on the configuration of the object and the substance from which it is made, is reflected from the object. Reflected energy returned to transducer 15 is converted into electrical signals which, subject to certain conditions hereinafter set forth, are processed and used to indicate presence of the object.

Under some conditions, particularly if the object is too close to the transducer, there may be problems in detecting presence of the object. These problems arise because transducer 15 unavoidably continues to resonate or ring for an interval of time after each transmission of a burst of acoustic energy. Until such ringing has subsided to a suitable level, transducer 15 and the associated signal processing circuitry are not able to distinguish incoming reflections from interference caused by ringing of the transducer. For present purposes, ringing interval is defined as the interval after transmission of a burst of acoustic energy during which the transducer and associated circuitry cannot effectively detect reflections of the acoustic energy from a target object because of ringing of the transducer. The ringing interval establishes a minimum range limit for direct object detection.

Figure 2:
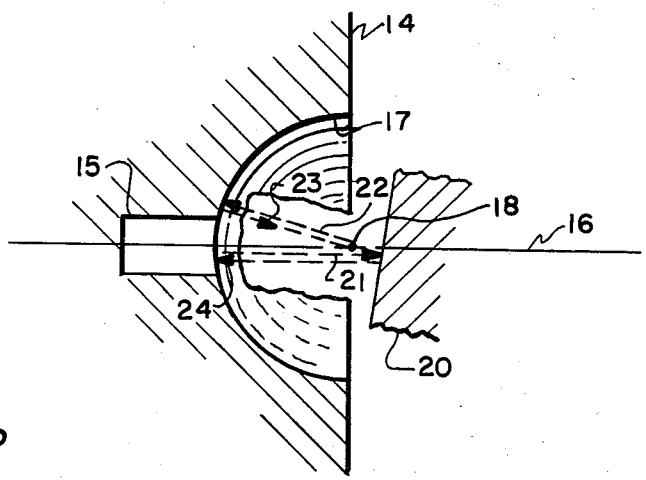
FIG. 2 is a diagram illustrating how acoustic energy is repeatedly reflected between the sensor of FIG. 1 and a very close target object.

As illustrated in FIG. 2, this limitation is overcome by reflecting surface 17 surrounding transducer 15. An object 20 is shown within the beam pattern of transducer 15 very close to the envelope of housing 11. Transducer 15 emits a burst of acoustic energy toward object 20 as indicated by dashed path 21. Receiver circuitry connected to transducer 15 is effectively disabled during transmission of the burst of acoustic energy and during the ringing interval thereafter. During the ringing interval, a portion of the acoustic energy impinging on object 20 is reflected back toward the sensor along path 22. This reflected acoustic energy impinges on surface 17 and/or the face of transducer 15 and is reflected back toward object 20 as indicated by path 23, and a portion of that energy is again reflected by object 20 toward transducer 15 as indicated by path 24. This process continues during a sufficient period of time for ringing of transducer 15 to subside to a level which permits acoustic energy reflected from object 20 to be detected by the transducer and associated receiver circuitry. Thus, the applicant's arrangement provides for object detection down to substantially zero distance from the sensor housing envelope.

Figure 3:
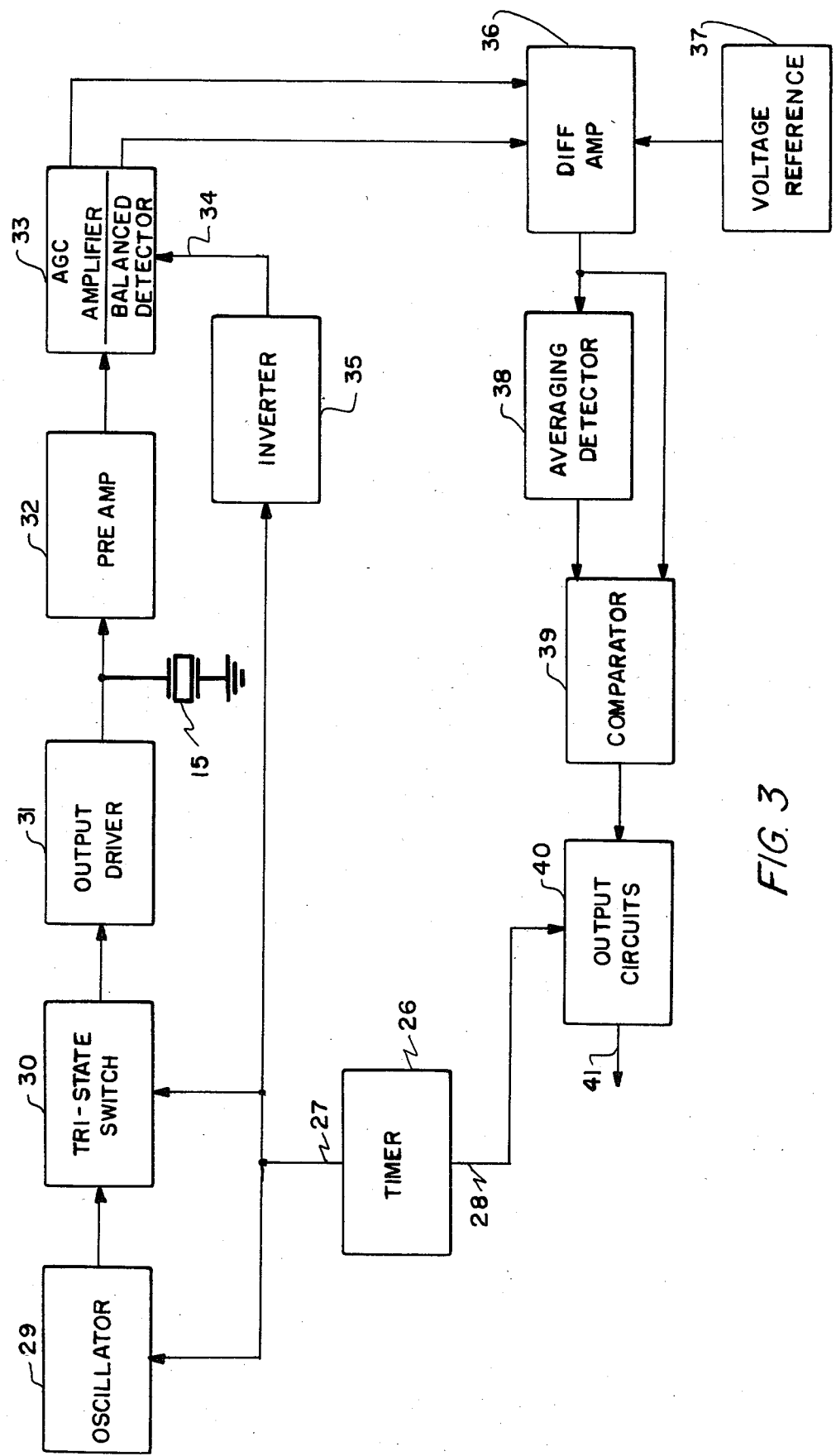
FIG. 3 is a block diagram of preferred transmit/-receive circuitry for an ultrasonic sensor in accordance with the present invention.

Transmit/receive circuitry suitable for driving transducer 15 and receiving and processing signals therefrom is shown in block diagram form in FIG. 3. Reference numeral 26 identifies timing means which provides necessary timing signals to the remainder of the circuitry. Timing means 26 has a first output terminal 27 at which are produced periodic pulses for controlling the driving signals supplied to transducer 15 and effectively disabling at least portions of the receiver circuit during that time. Timer 26 also has a second output terminal 28 at which is produced a signal for suitably enabling output circuits of the transmit/receive circuitry.

In one embodiment, timing means 26 produced a pulse 50 microseconds in duration every 8 milliseconds on output terminal 27. The signal at terminal 27 is supplied to an oscillator 29 which, during the pulse, supplies a burst of carrier signal. The carrier signal frequency is chosen to correspond to the resonant frequency of transducer 15. The output signal of oscillator 29 is supplied to switching means 30 which is also connected to receive the signal at terminal 27. The output of switching means 30 is supplied to an output driver 31 which produces the drive signal for transducer 15.

Acoustic energy received by transducer 15 is converted into electrical signals which are supplied though a preamplifier 32 to a balanced detector 33 comprising an AM receiver whose gain can be controlled by a signal at a gain control terminal 34. The signal at timer output terminal 27 is supplied through an inverter 35 to gain control terminal 34 so as to substantially reduce the gain of detector 33 at least during the intervals transducer 15 is being caused to transmit acoustic energy.

The output signals of detector 33 are supplied to a differential amplifier 36 which also receives a reference voltage from a voltage reference circuit 37. The reference voltage establishes a noise floor. If the signals produced by detector 33 exceed the noise floor, amplifier 36 passes the signals to an averaging detector 38 which, in conjunction with a comparator 39, performs a further test for signal validity. If the signals meet the validity tests, comparator 39 provides a signal to output circuits 40 which also receive a signal from timer output terminal 28, and which produce an indication of target detection on a detector output terminal 41. The signal at timer ouput terminal 28 effectively provides for indicating only objects within a certain range of the sensor. The signal at terminal 28 may be variable so that desired detection range limits can be set.

Figure 4:
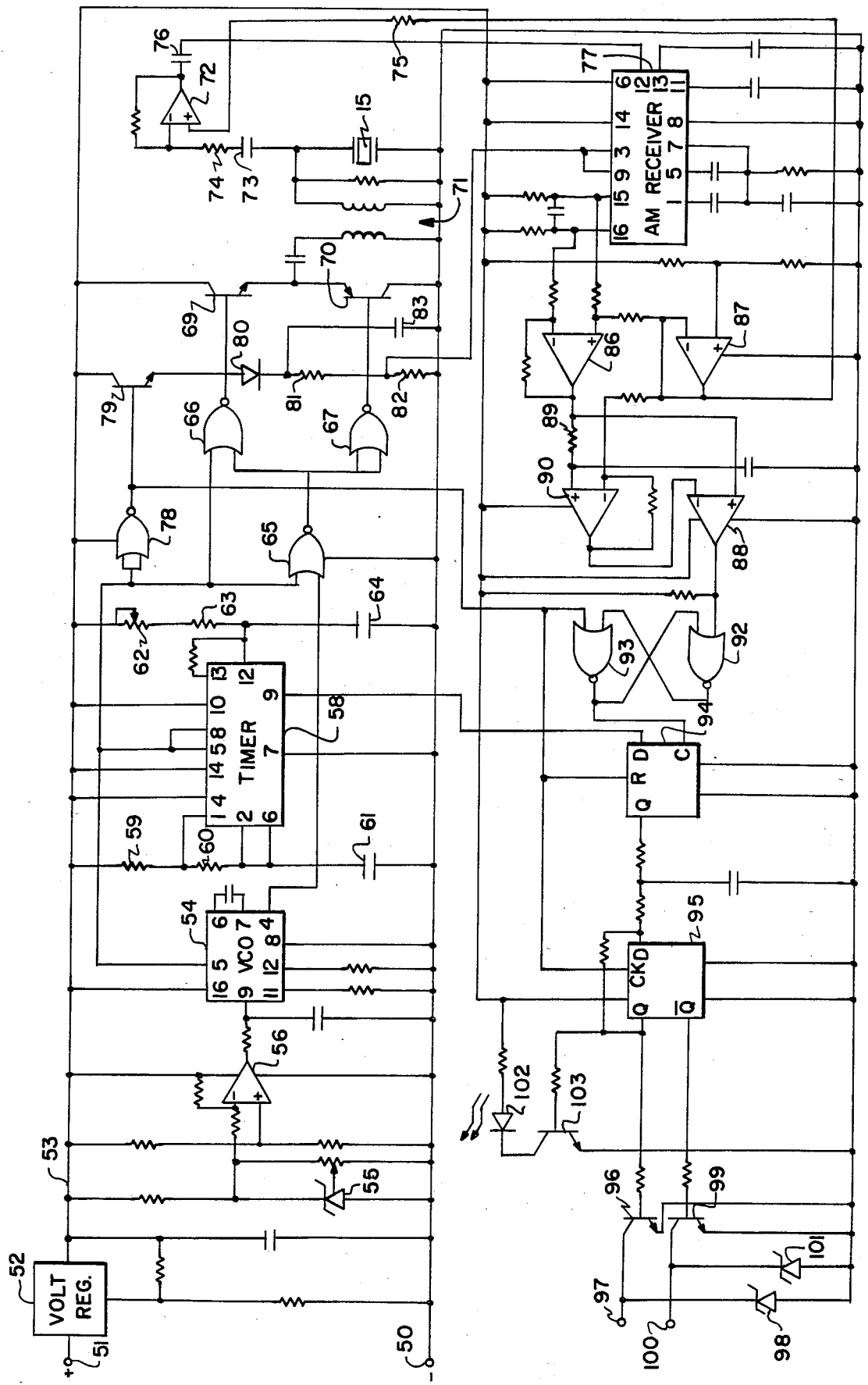
FIGS. 4 is a schematic circuit diagram of transmit/-receive circuitry corresponding to the block diagram of FIG. 3.

A specific circuit for carrying out the functions described in connection with the block diagram of FIG. 3 is shown in FIG. 4. A DC supply voltage (e.g., from 12 to 30 volts) is applied between a negative supply terminal 50 on a reference or ground bus and a positive supply terminal 51. The positive voltage is reduced to 9 volts DC by a voltage regulator 52 and supplied over positive voltage bus 53 to other components in the transmit/receive circuitry, as required.

Reference numeral 54 identifies an integrated circuit voltage controlled oscillator whose pin 9 is connected to a source of temperature compensated voltage comprising a variable resistance temperature sensor 55 and a differential amplifier 56 with associated biasing circuitry. A device suitable for temperature sensor 55 is an LM335 temperature sensor available from National Semiconductor Corporation. Oscillator 54 is also available from National Semiconductor Corporation as a model CD4046 voltage controlled oscillator. The temperature compensated voltage supplied to pin 9 causes the oscillator to operate at a constant frequency. In a specific embodiment, the frequency was set at 220 kHz.

Oscillator 54 also receives an input signal on pin 5 from an integrated circuit timer 58 and produces an output signal on pin 4. Functionally, pin 5 is an enabling terminal which allows an output from pin 4 when pin 5 receives an appropriate signal.

An integrated circuit timer suitable for use as timer 58 is commercially available from National Semiconductor Corporation or Signetics, Inc. as a model 556 timer. Timer 58 actually includes two timing circuits, one of which is controlled by input signals at pins 1, 2 and 6 and produces an output signal on pin 5, and the other of which is controlled by input signals on pin 12 and produces an output signal on pin 9. The control signals on pins 1, 2 and 6 are provided by a network comprising resistors 59 and 60 and a capacitor 61 connected in series between positive voltage bus 53 and ground. Resistor 59 primarliy controls the repetition rate of pulses produced on pin 5. In a specific embodiment a repetition rate of 8 milliseconds was selected. The pulse width was set at 50 microseconds primarily by resistor 60 and capacitor 61. Thus, oscillator 54 produced a 50 microsecond burst of 220 kHz carrier every 8 milliseconds on pin 4.

The output signal produced on pin 9 of timer 58 is controlled by a network comprising a variable resistor 62, a resistor 63 and a capacitor 64 connected in series between the positive voltage bus and ground. Pin 12 of timer 58 is connected to the junction between resistor 63 and capacitor 64. This network causes the output signal on pin 9 to go high after a predetermined delay following the 50 microsecond pulse produced on pin 5, the delay period depending on the setting of variable resistor 62. The output signal on pin 9 is used by output circuits as will hereinafter be described.

The output signal on pin 4 of oscillator 54 and the output signal on pin 5 of timer 58 are supplied to a tri-state switch comprising NOR gates 65, 66 and 67. Specifically, pin 4 of oscillator 54 and pin 5 of timer 58 are connected to the input terminals of NOR gate 65 whose output terminal is connected to one input terminal of NOR gate 66 and both input terminals of NOR gate 67. A second input terminal of NOR gate 66 is connected to pin 5 of timer 58. NOR gates 66 and 67 thus produce bipolar bursts of carrier frequency relative to a fixed reference.

The output signals of gates 66 and 67 are supplied to the base electrodes of a pair of complimentary driver transistors 69 and 70 respectively which provide a drive signal to one winding of a transformer 71 through a capacitor, the other winding of the transformer producing the drive signal for transducer 15. Transducer 15 is thus caused to emit a 50 microsecond burst of acoustic energy every 8 milliseconds.

As previously indicated, transducer 15 continues to ring for an interval of time after cessation of the drive signal. Signals appearing across transducer 15, including both the drive signal and signals resulting from reception of reflected acoustic energy, are supplied to the inverting input of a differential amplifier 72 through a capacitor 73 and resistor 74. The noninverting input of terminal of amplifier 72 is supplied with a stable reference voltage produced by circuitry which will hereinafter be described through a resistor 75.

The output terminal of amplifier 72 is coupled through a capacitor 76 to pin 12 of an integrated circuit AM receiver 77, such as a TCA440 receiver produced by Signetics, Inc. Receiver 77 includes an amplifier with variable gain and balanced detector. Gain is controlled by signals supplied to pins 3 and 9 which are connected to a gain control circuit comprising a NOR gate 78, a transistor 79, a diode 80, resistors 81 and 82, and a capacitor 83. Transistor 79 is connected through its emitter and collector electrodes in series with diode 80 and resistors 81 and 82 between the positive voltage bus 53 and ground. Capacitor 83 is connected and 82. The input terminals of NOR gate 78 are connected to pin 5 of timer 58. Pins 3 and 9 of receiver 77 are connected to the junction between resistors 81 and 82.

The gain control circuit operates such that it supplies a signal to receiver 77 which substantially reduces gain of the amplifier therein during and for a short while after each drive signal burst supplied to transducer 15. The length of the period after the end of the drive signal burst during which receiver gain is reduced is determined in part by capacitor 83. This period is set sufficiently long to cover the transducer ringing interval. Thus, signals transmitted by transducer 15 and caused by ringing of the transducer are prevented from being passed to circuitry following receiver 77.

The output signal from the balanced detector in receiver 77 is produced on pins 15 and 16 which are connected through resistors to the input terminals of a differential amplifier 86, of which the noninverting input terminal is supplied with a stable reference voltage provided by a differential amplifier 87 and associated biasing circuitry. Amplifier 87 also supplies the stable reference voltage to differential amplifier 72.

Amplifier 86 functions to provide a test whereby the output signal of receiver 77 is deemed valid only if its magnitude exceeds a noise floor established by amplifer 87. The output signal of amplifier 86 is supplied to the noninverting input terminal of a differential amplifier 88 connected as a comparator, and through a resistor 89 to the noninverting input terminal of a differential amplifier 90 which functions as an averaging detector. The output signal of amplifier 90 is connected to the inverting input terminal of amplifier 88 which produces an output signal only if the output signal of receiver 77 passes both noise floor and average level tests.

The output signal of amplifier 88 is supplied to one input terminal of a latch circuit comprising cross coupled NOR gates 92 and 93. A second input terminal of the latch circuit is connected to the output terminal of NOR gate 78 whereby the latch circuit is set to a first state upon production of a transducer drive pulse, and is set to a second state upon reception of a valid target reflection by transducer 15.

The output signal of the latch is supplied to a first flip-flop circuit 94. A second input terminal of flip-flop 94 is connected to pin 9 of timer 58, whereby flip-flop 94 is permitted to produce an output signal indicative of target detection only if a valid detection signal is received within a predetermined time interval after transmission of a burst of acoustic energy by transducer 15. This effectively causes the sensor to be sensitive only to targets within a predetermined range of the sensor, as is required in some applications. The range may be varied as previously described by adjusting variable resistor 62.

The output signal of flip-flop 94 is supplied to a second flip-flop 95 of which signals on the Q and $\overline{Q}$ output terminals are indicative of detection of a valid target within the predetermined range window. The Q output terminal is connected through a resistor to an output transistor 96 whose collector electrode provides a detector output signal on an output terminal 97. A Zener diode 98 is connected between output terminal 97 and ground to provide a fixed limit for the voltage on output terminal 97. Similarly, the $\overline{Q}$ output of flip-flop 95 is connected to a transistor 99 whose collector terminal is connected to a detector output terminal 100. The voltage at output terminal 100 is also limited by a Zener diode 101 connected between output terminal 100 and ground. Output terminals 97 and 100 provide output signals which may be used for any suitable control or display purpose.

A visual indication of target detection is provided by means of a light emitting diode 102 driven by a transistor 103 whose base electrode is connected through a resistor to the Q output terminal of flip-flop 95.

In accordance with the foregoing discussion, the applicant has provided a single transducer pulse transmission ultrasonic object sensor capable of reliably detecting the presence of an object down to substantially zero distance from the sensor envelope. A single embodiment of the ultrasonic sensor including preferred transmit/receive circuitry has been disclosed for illustrative purposes. However, a variety of modifications and variations of the physical and electrical features will be apparent to those of ordinary skill in the relevant arts. It is not intended that coverage be limited to the disclosed embodiment, but only by the terms of the following claims.

The embodiments of the invention in which an exclusive property or right is claimed are defined as follows:

1. An ultrasonic sensor comprising:
   an electroacoustic transducer adapted to alternately emit a burst of acoustic energy along an axis in a first direction in response to a corresponding electrical drive signal and convert the portion of the burst of acoustic energy reflected back from a remote target to a corresponding electrical signal, said transducer being subject to unavoidable ringing for a time interval after each emission of a burst of acoustic energy, the ringing interval establishing a minimum range for direct target direction, said transducer being responsive to acoustic energy received from the target after the end of the ringing interval to produce a target detection signal; and
   a housing supporting said electroacoustic transducer and including retroreflector means proximate said transducer adapted to reflect acoustic energy in the first direction, whereby acoustic energy reflected from the target continues to be reflected between the retroreflector and the target for an interval longer than the ringing interval to enable said transducer to produce a detection signal for targets at less than the minimum range for direct detection.

2. The ultrasonic sensor of claim 1 wherein said rectroreflector means comprises a reflective surface configured as a spherical section having its center of curvature substantially on the axis of said electroacoustic transducer.

3. The ultrasonic sensor of claim 2 wherein the center of curvature of the reflective surface is located at a distance approximately two-thirds the minimum direct target detection range from said electroacoustic transducer.

4. The ultrasonic sensor of claim 3 further including:
   transmit/receive circuitry connected to said electroacoustic transducer and operable to periodically cause said transducer to emit a burst of acoustic energy and to receive signals from said transducer resulting from reception of reflections of the emitted acoustic energy, said transmit/receive circuitry including a receiver circuit whose gain is controllable and gain control means for reducing the gain of said receiver circuit during each emission of a burst of acoustic energy by said transducer and for an interval of time thereafter at least as long as the ringing interval.

5. The electroacoustic transducer of claim 4 wherein:
   said transmit/receive circuitry includes a transmitter circuit which periodically supplies an electrical drive signal to said electroacoustic transducer for causing it to emit a burst of acoustic energy;
   said receiver circuit has a gain control terminal; and
   said gain control means includes a gain control circuit connected to said transmitter circuit and the gain control terminal of said receiver circuit for supplying a gain control signal coordinated with the drive signal and functioning to substantially reduce the gain of said receiver circuit at least for the duration of the drive signal and the ringing interval.

6. The ultrasonic sensor of claim 5 wherein said housing includes a head in which said electroacoustic transducer is supported and a body containing said transmit/receive circuitry.

7. The ultrasonic sensor of claim 6 wherein said head is detachable from said body.

8. The ultrasonic sensor of claim 1 further including:
   transmit/receive circuitry connected to said electroacoustic transducer and operable to periodically cause said transducer to emit a burst of acoustic energy and to receive signals from said transducer resulting from reception of reflections of the emitted acoustic energy, said transmit/receive circuitry including a receiver circuit whose gain is controllable and gain control means for reducing the gain of said receiver circuit during each emission of a burst of acoustic energy by said transducer and for an interval of time thereafter at least as long as the ringing interval.

9. The electroacoustic transducer of claim 8 wherein:
said transmit/receive circuitry includes a transmitter circuit which periodically supplies an electrical drive signal to said electroacoustic transducer for causing it to emit a burst of acoustic energy;
said receiver circuit has a gain control terminal; and
said gain control means includes a gain control circuit connected to said transmitter circuit and the gain control terminal of said receiver circuit for supplying a gain control signal coordinated with the drive signal and functioning to substantially reduce the gain of said receiver circuit at least for the duration of the drive signal and the ringing interval.

10. A single transducer ultrasonic target detector comprising:
a housing body;
a head on said housing body, said head including retroreflector means adapted to reflect acoustic energy impinging thereon from a direction along an axis substantially back along the axis, said housing body and said head defining a housing envelope;
an electroacoustic transducer mounted in said head proximate said retroreflector means, said transducer being positioned to transmit and receive acoustic energy along the axis; and
transmit/receive circuitry connected to said electroacoustic transducer, said transmit/receive circuitry being adapted to alternately cause said electroacoustic transducer to transmit a burst of acoustic energy and receive electrical signals resulting from receipt by said electroacoustic transducer of reflections of the burst of acoustic energy from a target, said transducer being subject to unavoidable ringing for a ringing interval after each transmission of a burst of acoustic energy, whereby the presence of a target within a minimum distance from the housing envelope cannot be directly detected, but can be indirectly detected as a result of sustained reflection of acoustic energy between the target and said retroreflector means for a time interval substantially as long as the ringing interval of said transducer.

11. The ultrasonic target detector of claim 10 wherein said retroreflector means comprises a reflective surface configured as a spherical section having its center of curvature substantially on the axis.

12. The ultrasonic target detector of claim 11 wherein the center of curvature of the reflective surface is located at a distance from said electroacoustic transducer equal to approximately two-thirds the travel distance of acoustic energy during one-half the ringing interval.

13. The ultrasonic target detector of claim 12 wherein said transmit/receive circuitry includes:
a receiver circuit whose gain is controllable; and
gain control means for reducing the gain of said receiver circuit during each transmission of a burst of acoustic energy by said electroacoustic transducer and for a time interval thereafter at least as long as the ringing interval.

14. The ultrasonic target detector of claim 13 wherein:
said transmit/receive circuitry includes a transmitter circuit which periodically supplies an electrical drive signal to said electroacoustic transducer for causing it to transmit a burst of acoustic energy;
said receiver circuit has a gain control terminal; and
said gain control means includes a gain control circuit connected to said transmitter circuit and the gain control terminal of said receiver circuit for supplying a gain control signal coordinated with the drive signal and functioning to substantially reduce the gain of said receiver circuit for at least the duration of the drive signal and the ringing interval.

15. An ultrasonic sensor comprising:
an electroacoustic transducer adapted to project acoustic energy along an axis in a first direction when driven by an electrical signal and to produce an electrical signal when receiving acoustic energy, the damping characteristics of said electroacoustic transducer unavoidably being such that it continues to mechanically resonate for a time interval after cessation of an electrical drive signal, the resonating interval establishing a minimum range for direct target detection, said transducer being responsive to acoustic energy received after the end of the resonating interval to produce a target detection signal; and
a housing supporting said electroacoustic transducer and including rectroreflector means proximate said electroacoustic transducer adapted to reflect acoustic energy in the first direction, at least a portion of acoustic energy reflected from a target being reflected by said rectroreflector back toward the target to sustain reflections for an interval longer than the resonating interval to permit detection of targets at less than the minimum range for direct detection.

16. The ultrasonic sensor of claim 15 wherein said retroreflector means comprises a reflective surface configured as a spherical section having its center of curvature substantially on the axis of said electroacoustic transducer.

17. The ultrasonic sensor of claim 16 wherein the center of curvature of the reflective surface is located at a distance from said electroacoustic transducer equal to approximately two-thirds the minimum direct target detection range.

18. A method for detecting the presence of a target with an ultrasonic sensor having a single electroacoustic transducer where the target is closer to the transducer than a minimum direct detection range limit arising from unavoidable ringing of the transducer for a time interval following transmission of a burst of acoustic energy, the method comprising the steps of:
transmitting a burst of acoustic energy from the transducer toward the target;
repeatedly reflecting at least a portion of the acoustic energy reflected from the target back toward the target; and
detecting acoustic energy reflected from the target by means of the transducer after the ringing interval has passed.

19. The method of claim 18 wherein the step of repeatedly reflecting at least a portion of the acoustic energy is performed by a reflecting surface surrounding the electroacoustic transducer.

20. The method of claim 19 wherein the reflecting surface is configured as a spherical section having its center of curvature centered in the transducer beam pattern at a distance from transducer equal to approximately two-thirds the minimum direct direction range limit.

* * * * *